United States Patent [19]

Hughlett

[11] Patent Number: 5,239,170

[45] Date of Patent: Aug. 24, 1993

[54] AUTOFOCUS METHOD AND APPARATUS FOR IMAGING MICROSCOPY USING A PREDETERMINED VISUAL IMAGING FEATURE

[75] Inventor: R. Emmett Hughlett, Waterbury, Vt.

[73] Assignee: Karl Suss America, Incorporated, Waterbury Center, Vt.

[21] Appl. No.: 781,825

[22] Filed: Oct. 23, 1991

[51] Int. Cl.$^5$ ............................................... G01J 1/20
[52] U.S. Cl. ................................. 250/201.3; 359/381
[58] Field of Search .................. 250/201.3, 201.2, 561; 359/368, 381

[56] References Cited

U.S. PATENT DOCUMENTS

4,230,940 10/1980 Minami et al. ................. 250/201.3
4,255,029 3/1981 Freudenschuss ................ 250/201.3

Primary Examiner—David C. Nelms
Assistant Examiner—Stephone B. Allen
Attorney, Agent, or Firm—Perman & Green

[57] ABSTRACT

A method of, and apparatus for, automatically focussing a microscope objective (18). The apparatus includes an image detector (26) for obtaining an image, through the microscope objective, of a surface having at least one visual feature. The apparatus further includes a processor (28) for determining, from the image, a plurality of overlapping curves, each of which represents a quality of focus for different areas of the feature. The apparatus also includes an actuator (32), controlled by the processor, for positioning the microscope objective at an optimum focus position, relative to the surface, based upon the shape, specifically the sign of the slope, of the overlapping curves.

20 Claims, 5 Drawing Sheets

FIG. 8
REGION DETERMINATION PROCESS STEPS FOR SAMPLE 3 (FIG. 4)

AUTOFOCUS METHOD AND APPARATUS FOR IMAGING MICROSCOPY USING A PREDETERMINED VISUAL IMAGING FEATURE

FIELD OF THE INVENTION

This invention relates generally to microscopy and, in particular, to automatic focussing techniques for focussing upon a planar object, such as an integrated circuit.

BACKGROUND OF THE INVENTION

Modern laboratory and industrial microscopy systems incorporate digital imaging to achieve both high resolution and throughput. These systems rely on the provision of an automatic focus (autofocus) capability. The technical problems that arise in autofocus applications are defined in large part by the limits of the imaging system. By example, high magnification (e.g. 50×) microscopes may have a working-distance to depth-of-focus (DOF) ratio of 10,000, thereby rendering conventional autofocus search techniques laboriously slow and inaccurate. Furthermore, the optical properties associated with the image plane typically vary from image to image, making conventional amplitude-dependent autofocus evaluation techniques less than optimum.

It is thus one object of the invention to provide an autofocus technique that provides high accuracy, high speed to achieve greater throughput, a large capture range, and a reduced sensitivity to image plane optical property variations.

SUMMARY OF THE INVENTION

The foregoing and other problems are overcome and the objects of the invention are realized by methods and apparatus for automatically determining an optimum focus position for a microscope objective. The method includes three primary steps. A first step obtains and filters images of a feature, such as a shadow, that is projected upon an image plane. This step obtains a plurality of curves referred to as focus figure-of-merit (FOM) curves. A second step accomplishes a non-linear objective region determination based upon the shape of the plurality of FOM curves. A third step determines an optimum focus position based upon the region determination.

In greater detail, the first primary step is preferably accomplished with a digital signal processor so as to obtain high speed operation. A Digital Signal Processing (DSP) filtering technique is applied to a digitized image. The input information to the DSP is defined by three small areas-of-interest (AOI). The DSP technique yields a set of curves describing the "goodness of focus" or focus FOM, as a function of a position of the microscope objective.

That is, in the first primary step the AOIs are dynamically located to control the range of capture. Significantly, the resultant form or shape of the FOM curves is invariant regardless of the image optical properties, such as reflectance.

The second primary step exploits the consistent form of the FOM curves to rapidly determine a current microscope objective position relative to an as-yet-unknown optimum focus position. All possible objective positions are unambiguously classified based on a local form of the FOM curves. These classifications are referred to herein as regions. The region associated with the current objective position is quickly determined with a three point sample series. Knowledge of the current region is applied so as to position the objective to a point near the optimum focus position, namely a near focus region which is known to include the optimum focus position.

That is, in the second primary step the method applies a region determination technique for computational efficiency, and the regions are determined based on curve form, not curve amplitude.

The third primary step again exploits the consistent form of the FOM curves to achieve an accurate calculation of the final focus position. A focus FOM curve, associated with a centrally located AOI, is sampled near the true focus position with a sparse set of five samples. These five samples are employed to determine a final, optimum focus position for the microscope objective through the use of a zero crossing technique.

The third primary step determines the optimum focus position very accurately and repeatably, within 10% of depth of field, using the sparse sample size of five samples. Once again, the determination is based on the form of the FOM curve, and not upon the amplitude.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
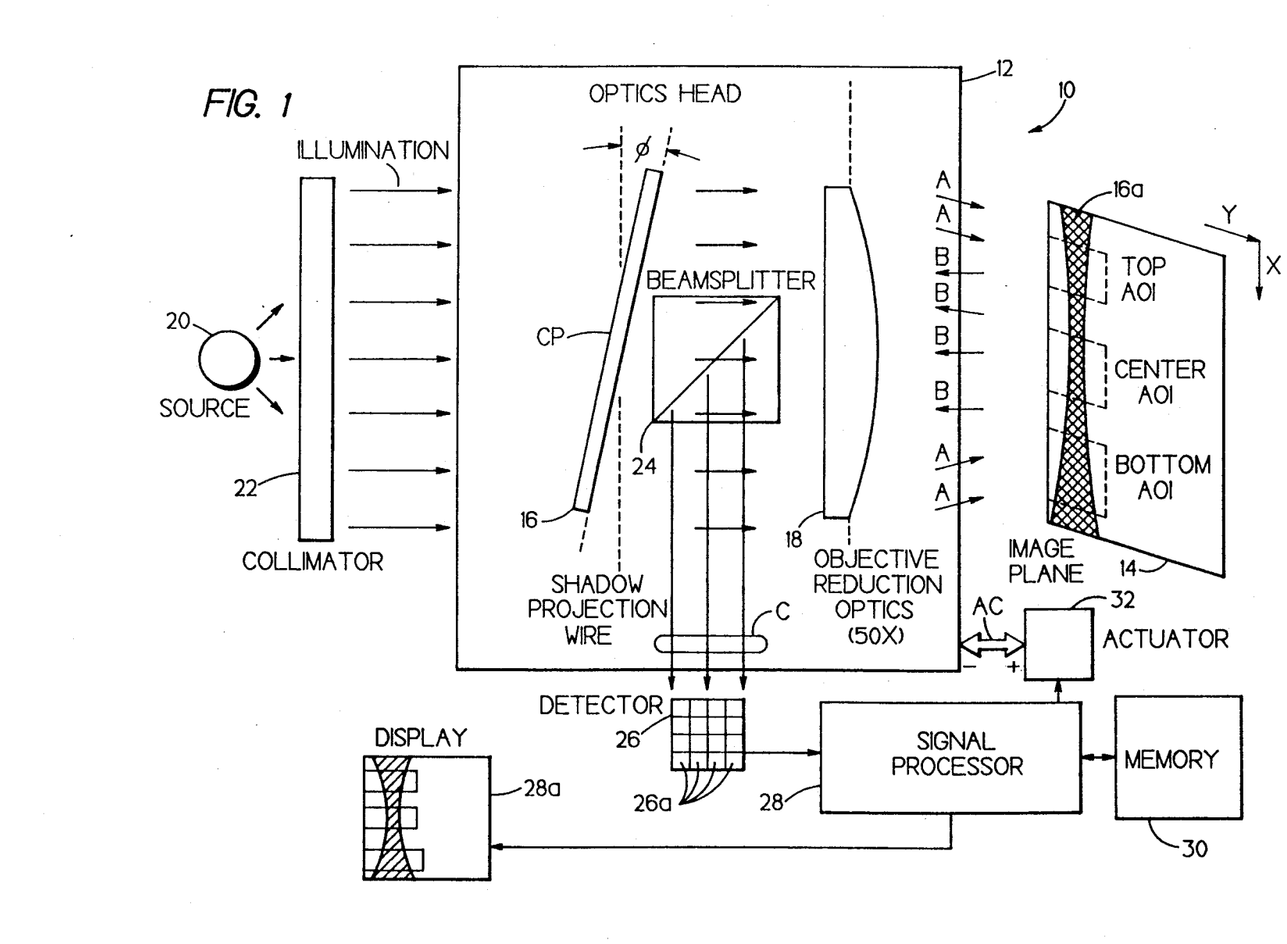
FIG. 1 is a block diagram illustrating an autofocus system of the invention.

Referring to FIG. 1 there is shown a block diagram illustrating an autofocus system 10 of the invention, the system 10 employing a focus reference, shadow projection technique.

A microscope, or optics head 12, is positioned for viewing an image plane 14 at which a planar object is disposed. By example, and not as a limitation upon the practice of the invention, the planar object may be an integrated circuit. The optics head 12 includes a thin wire 16 that is fixed in an illumination path of the optics head 12 at an angle $\phi$ from the image plane. The center point (CP) of the wire 16 is positioned at a front focal plane of an objective reduction optics, or objective 18. The front focal plane is to the left of the objective 16 in FIG. 1. When the image plane 14 is in focus, the projected shadow of the wire 16 CP is also in focus. The goal of the system 10 is to automatically adjust the objective-to-image distance so that the wire 16 CP shadow, and hence the image, is in focus. The sharp intensity transitions associated with the focussed portion of the wire 16 appear to run up and down the projected shadow as the objective-to-image distance is varied. Preferably, the wire 16 shadow is projected on the image plane 14 field of view (FOV) edge to avoid obscuring the image.

For a 50× objective the wire 16 may be a wire having a length of approximately 10 mm and a thickness of approximately 10 micrometers to approximately 20 micrometers. Twenty degrees is a suitable angle of inclination between the wire 16 and the image plane.

The system 10 further includes an illumination source 20, such as a tungsten bulb, a collimating optic 22, which may be embodied within a length of optical fiber, a 50—50 beamsplitter 24, and a radiation detector 26, such as a two-dimensional CCD organized as rows and columns of image pixels 26a. Pixel separation on CCD is approximately 10 micrometers; thus pixel sample spacing, after 50× magnification, is approximately 200 nanometers.

Coupled to an output of the radiation detector 26 is a processing device that preferably includes a digital signal processor 28 having a memory 30 coupled thereto. The memory 30 stores instructions for causing the processor 28 to operate so as to accomplish the method of the invention. The memory 30 also provides temporary storage of results obtained by the processor 28, as will be detailed below. The processor 28 has an output coupled to an actuator 32, such as a piezoelectric device, that is mechanically coupled to the optics head 12 for translating same along an axis perpendicular to the image plane 14, in the directions indicated by the arrow AC. Movement towards the image plane 14 is considered herein to be a positive motion, while movement away from the image plane 14 is considered to be a negative motion. Translation of the optics head 12 is required to determine the optimum focus point, as will be described in detail below.

A display 28a is provided so than an operator may view the magnified image that is detected by the radiation detector 26.

The optics head 12 operates to provide illumination, indicated by the arrows A, to the image plane 14; to receive therefrom reflected radiation, indicated by the arrows B; to magnify the reflected radiation; and to provide, via the beamsplitter 24, a magnified image, indicated by the arrows C, to the radiation detector 26.

Having thus described the optical system, a description is now made of a presently preferred method of operating same.

Also shown in FIG. 1, at the image plane 14, are relatively small top, center, and bottom areas of interest (AOI) that are defined along the projected shadow 16a of the wire 16. The position of each AOI is dynamically adjustable, with the center AOI being adjusted to capture the optimum shadow, and hence image, focus.

In regard to AOI adjustment, the operator specifies the position of an AOI by the input of upper-left corner coordinates (Xul, Yul) and lower-right corner coordinates (Xlr, Ylr). These coordinates may be entered by a keyboard or a conventional pointing device, such as a mouse. The processor 28 displays the so defined AOI rectangles on the display 28a, overlaying the displayed CCD image.

Guidelines for specifying AOI position are as follows.

A. When the image is in focus, the center AOI is positioned so that the in-focus portion of the wire 16 shadow is centered in the center AOI.

B. The minimum AOI x-axis dimension must be long enough to encompass the shadow image width both in and out of focus;

C. The maximum AOI x-axis dimension is not strongly bounded. In the interest of computational efficiency, the x-axis dimension length should meet the above criteria (B), and no more.

D. The minimum AOI y-axis dimension must be long enough to encompass the in-focus portion of the wire shadow.

E. The maximum AOI y-axis dimension is not strongly bounded. However, a too-large y-axis dimension leads to ambiguity in that the wire 16 shadow may be in-focus at different locations within the AOI. This leads to a distortion of the FOM curve, described below, and to an inaccuracy in a centroid calculation. Thus, the y-axis dimension length should meet the above criteria (D), and no more.

Figure 2A:
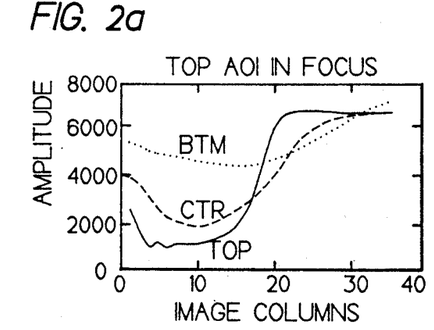
FIGS. 2a–2d graphically illustrate a technique for determining an focus figure-of-merit (FOM) for a plurality of areas-of-interest (AOIs for any given objective-to-image distance.
Figure 2B:
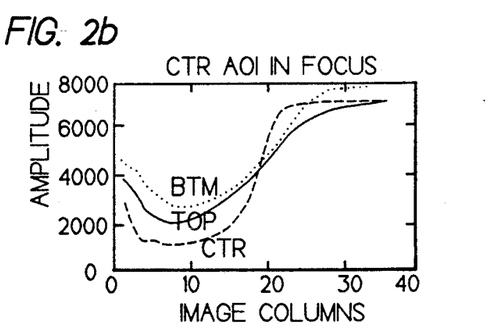
Figure 2C:
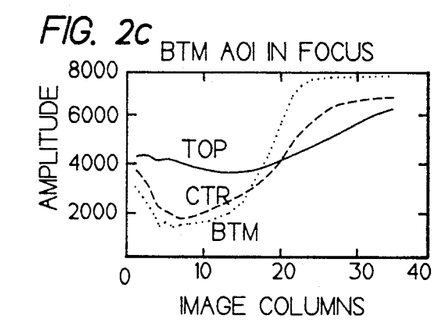
Figure 2D:
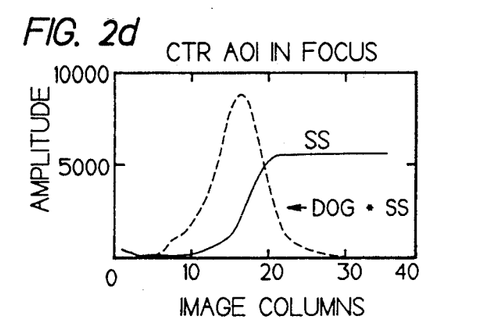

FIGS. 2a-2d illustrate how a focus figure-of-merit (FOM) is calculated for each AOI for any given objective-to-image distance. The two-dimensional (2-d) AOI image data that is received from detector 26 is compressed, in real time, to a 1-d sequence. This is accomplished by a technique known as summation projection, or density projection, and compresses the CCD detector 26 pixel 26a amplitudes along the CCD detector 26 image columns. Thus, the shadow 16a edge contrast is quantified in a 1-D summed sequence (SS) for each AOI. FIGS. 2a-2c show the relative edge contrast when each of the top, center, and bottom AOI's are in focus, respectively. The FOM for an AOI is based on the peak-to-peak amplitude of the SS gradient. A gradient (DOG * SS) is obtained by convolution with a derivative-of-gaussian filter (DOG), as is seen in FIG. 2d. As employed herein the symbol (*) denotes a discrete convolution. As the objective-to-image distance, or optics head 12 position, varies, the FOM amplitude for an AOI changes predictably. The FOM amplitude is largest when the AOI captures a focussed portion of the wire 16 shadow 16a.

Figure 3:
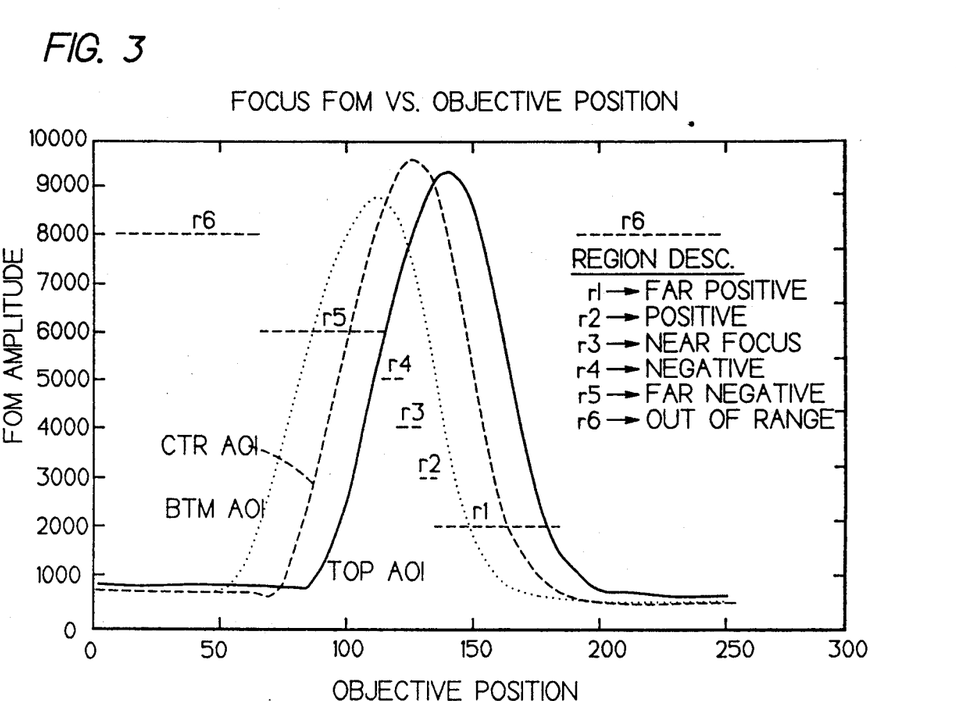
FIG. 3 is a graph that illustrates focus FOM plotted against objective position.

FIG. 3 shows the relationship between each AOI FOM and the objective 12 position. The FOM amplitude for the bottom AOI is shown as a dotted line, the FOM amplitude for the center AOI is shown as a dashed line, and the FOM amplitude for the top AOI is shown as a solid line.

As can be seen, the three overlapping FOM curves, or peaks, are of gaussian form. Each FOM curve's centroid (mean) is a function of the AOI position along the shadow 16a. This allows for expansion and contraction of the capture range, through placement of the top and bottom AOI. Moving the top and bottom AOI farther away from the center AOI increases the capture range. That is, the centroid of the top AOI FOM curve moves positively away from the center AOI FOM curve centroid. Similarly, the bottom AOI FOM curve centroid moves negatively away from the center AOI FOM curve centroid. The effect is to increase the extent of r2 and r4, decreasing the extent of r6, which increases the capture range. The significance of r2, r4, and r6 is described below in reference to Table 1.

It should be noted that it is not always desirable to maximize the capture range. By example, when two partially reflective image planes (e.g., top and bottom sides of planar glass, or a mask and semi-conductor wafer in proximity) are in parallel proximity, the dual focus planes may interfere. This intereference is manifested in double-humped FOM curves. This interference may be avoided by making the capture range small.

The capture range is proportional to the DOF, and is considered herein to be bounded by maximum out-of-focus positions of the objective 12, from the image plane 14, that still enables a sufficient signal to be obtained in order to achieve autofocus. The amplitudes of the FOM curves vary with image optical properties, such as reflectance, but the form and width of the FOM curves are substantially invariant, being primarily a function of the wire 16 placement angle ($\phi$), and the DOG filter (bandwidth).

Figure 6:
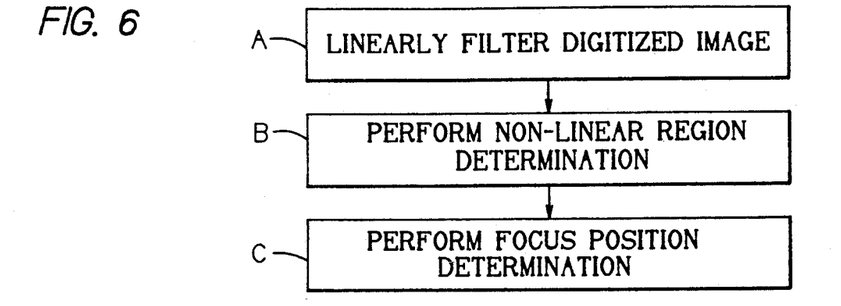
FIG. 6 is a flow chart illustrating a three step method of the invention that includes the steps of linearly filtering a digitized image, performing a non-linear region determination, and performing a final focus position determination.
Figure 7:
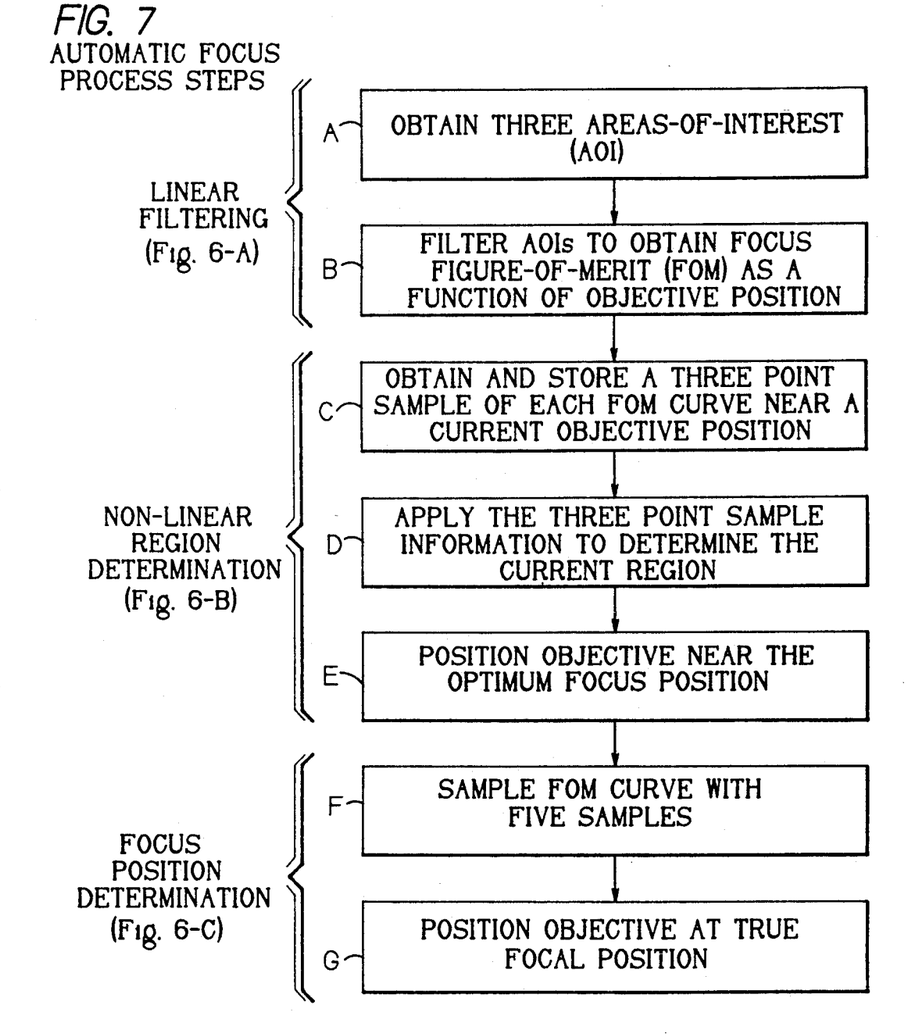
FIG. 7 is a flow chart illustrating in greater detail several sub-steps of each of the steps of the method of FIG. 6.

The foregoing description coincides with Block A of the flowchart of FIG. 6, and to blocks A and B of the flow chart of FIG. 7.

The image plane 14 is scanned to obtain three AOIs, and the AOIs are linearly filtered to obtain the FOM curve of FIG. 3, as a function of objective 12 position.

A function of the signal processor 28 is to rapidly search for and find a centroid of the center AOI FOM peak. This is physically identical to focussing the wire 16 shadow 16a within the center AOI. The technique applies a novel non-linear region classification method that is based on a local monotonicity of each overlapping FOM curve. The horizontal lines (r1–r6) in FIG. 3 define the extent of each region classification, as set forth in Table 1.

TABLE 1 r1: The objective 12 position is too far positive relative to the center AOI centroid. The top FOM curve is monotonically decreasing.

r2: The objective 12 position is slightly positive relative to the center AOI centroid. The top FOM curve is monotonically increasing and the center FOM curve is monotonically decreasing.

r3: The objective 12 position is near focus, and is close to the center AOI centroid. The center FOM curve is near its, amplitude maximum.

r4: The objective 12 position is slightly negative relative to the center AOI centroid. The bottom FOM curve is monotonically decreasing and the center FOM curve is monotonically increasing.

r5: The objective 12 position is significantly negative relative to the center AOI centroid. The bottom FOM curve is monotonically increasing.

r6: The objective 12 position is indeterminate and out of range. All three FOM curves are non-monotonic.

These regional relationships are invariant from image to image and are preferably predetermined and stored.

So as to optimize autofocus speed and increase throughput, each entire FOM curve is not measured during the autofocus procedure. Instead, the FOM curves are sparsely sampled by changing the objective 12 position and processing the AOI image information. An intermediate goal of this sparse sampling is to position the objective 12 in region r3 (near focus). Once in region r3, the objective 12 position is sufficiently close to the optimum focus position to sample the center FOM amplitude so as to determine the center FOM centroid. Then, the objective 12 is moved to the centroid position to obtain optimum focus.

The foregoing description corresponds to Block B of FIG. 6, and to Blocks C, D, and E of FIG. 7.

Figure 4:
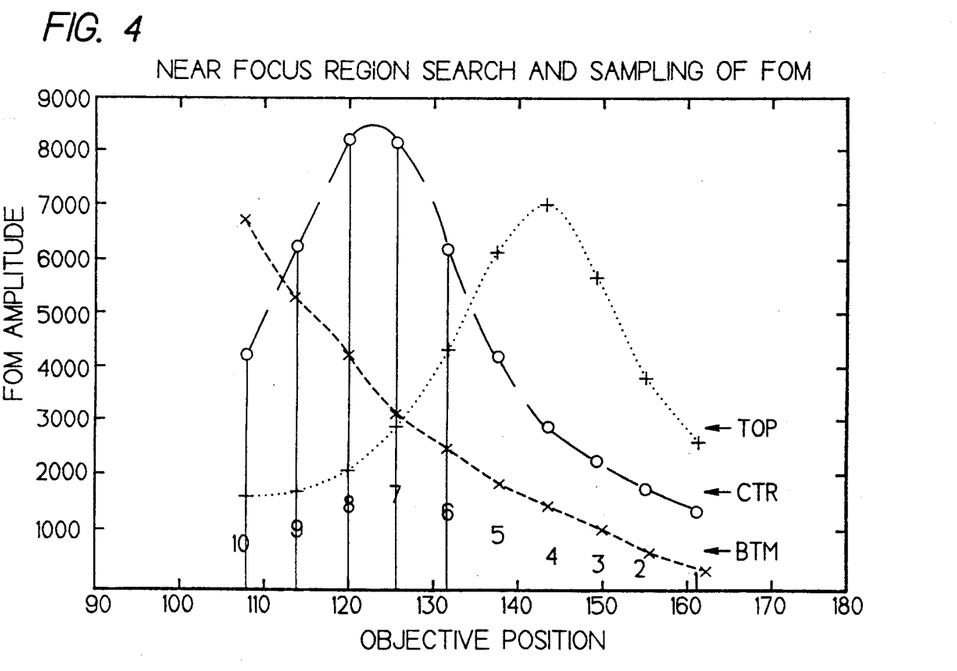
FIG. 4 is a graph that illustrates a near focus region search and sampling FOM plotted against objective position.
Figure 8:
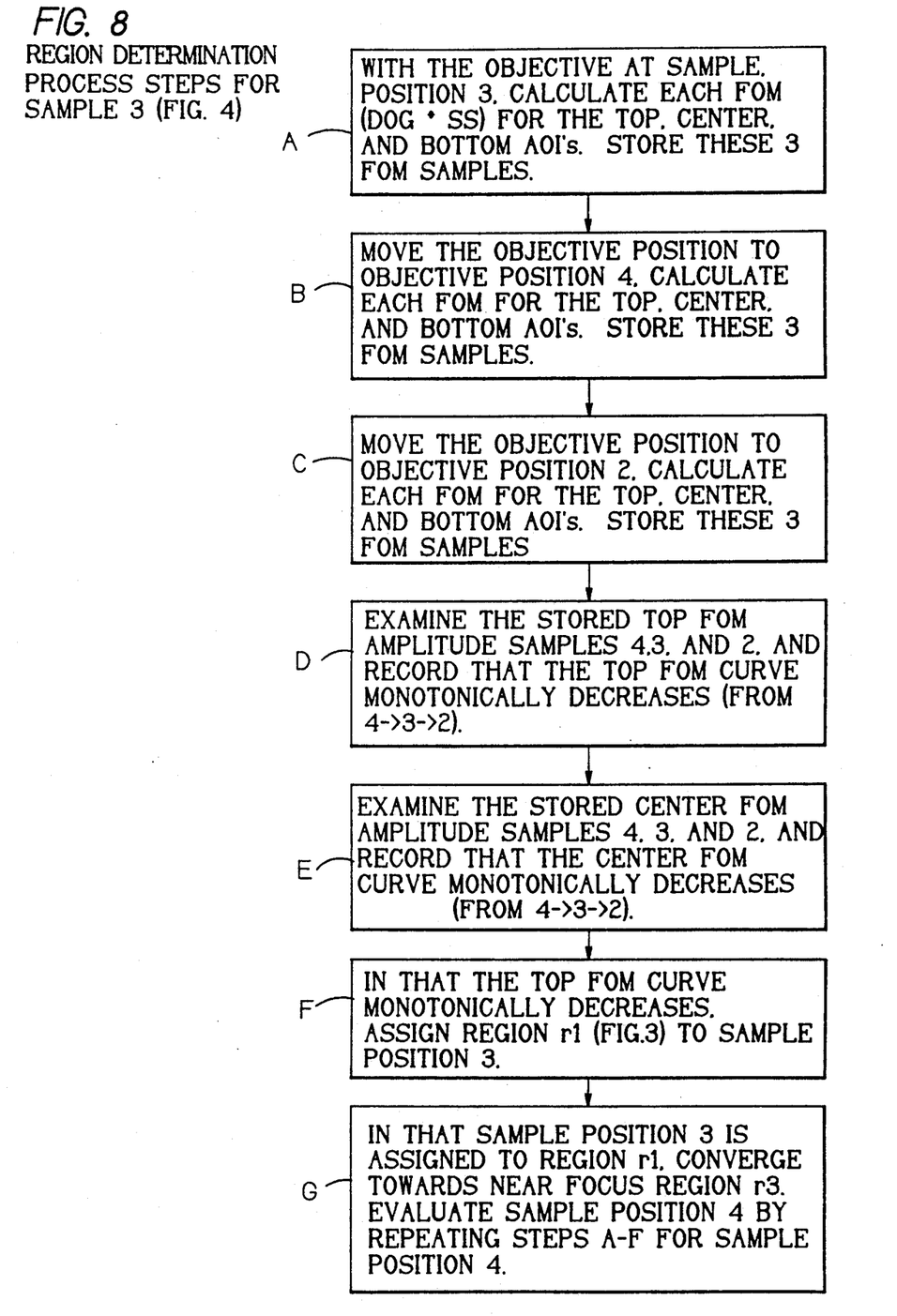
FIG. 8 illustrates in further detail sub-steps included within the step of non-linear region determination of FIG. 6.

FIG. 4 illustrates the intermediate search for the near focus region (r3), as well as the sampling of the center FOM for centroid calculation. In FIG. 4, the plotted samples are numbered 1 through 10. Samples 1 through 8 correspond to the search for region r3 (near focus) in FIG. 3 (Blocks C, D, E of FIG. 7). For any given objective 12 position, the region associated with that position is determined based on the monotonicity, or sign of the slope, of the three overlapping FOM curves. Only three sample positions are required to determine the current region. By example, the region associated with sample position 3 of FIG. 4 is calculated as follows. The letter designators correspond to the steps of the flowchart of FIG. 8.

A. With the objective 12 at sample position 3, determine each FOM as (DOG * SS) for the top, center, and bottom AOI's. Store these three FOM samples.

B. Move the objective 12 position negatively to arrive at position 4, calculate each FOM for the top, center, and bottom AOI's. Store these three FOM samples.

C. Move the objective 12 position positively to objective 12 position 2, calculate each FOM for the top, center, and bottom AOI's. Store these three FOM samples.

D. Examine the stored top FOM amplitude samples 4, 3, and 2, and record that the top FOM curve monotonically decreases (from 4-3-2).

E. Examine the stored center FOM amplitude samples 4, 3, and 2, and record that the center FOM curve monotonically decreases (from 4-3-2).

F. In that the top FOM curve is monotonically decreasing, assign, in accordance with Table 1, region r1 (far positive) to sample position 3.

G. In that sample position 3 is determined to lie within region r1, move the objective 12 in a direction towards the near focus region r3, thereby converging on r3. That is, next evaluate sample position 4 by repeating the region determination method, steps A–F.

The above steps are repeated until convergence to a sample position within the near focus region r3 is obtained. In FIG. 4, sample 8 is the first sample position found to be in region r3 (near focus). Samples 9 and 10 are then taken to complete the sparse five sample set, comprised of samples 6 through 10, of the center FOM. The five sample set is delineated in FIG. 4 by the vertical lines.

Figure 5:
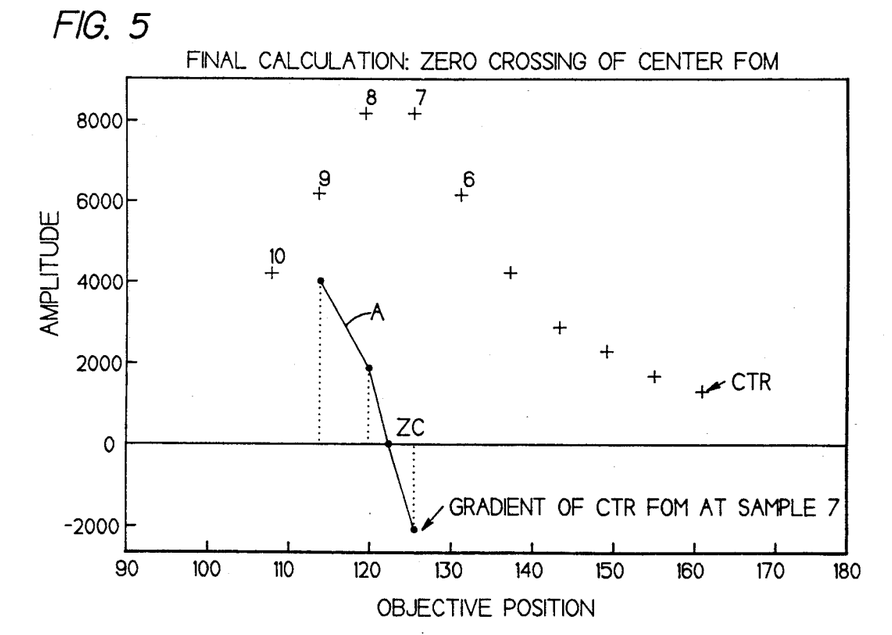
FIG. 5 is a graph that illustrates, for a focus final calculation technique, a zero crossing of a center FOM amplitude plotted against objective position.

FIG. 5 illustrates a method by which the five sample set of the center FOM curve is used to determine the optimum focus position. The optimum focus position corresponds to the centroid, or mean, of the center FOM peak. This centroid is determined by finding the zero crossing (ZC) of the gradient of the center FOM curve. In FIG. 5, three gradient evaluations are determined by:

*gradient sample 7 = (sample 6) − (sample 8);*

*gradient sample 8 = (sample 7) − (sample 9); and*

*gradient sample 9 = (sample 8) − (sample 10).*

These three gradient points form a short curve, designated A in FIG. 5, that is theoretically guaranteed to cross through zero amplitude. The ZC location is calculated by conventional methods. The ZC location is the optimum focus position for the objective 12, which is the desired result.

It should be realized that various modifications may be made to the above teachings. For example, the wire 16 may be oriented horizontally instead of vertically. For this case the summed projection technique sums CCD row elements, as opposed to column elements, in each AOI. Also for this case, the AOIs are arranged horizontally, instead of vertically, and reference is made to a left AOI and a right AOI, as opposed to top and bottom AOIs. However, all of the relationships expressed above apply equally as well to both the vertical and the horizontal linear shadow projections.

Thus, while the invention has been particularly shown and described with respect to a preferred embodiment thereof, it will be understood by those skilled in the art that changes in form and details may be made therein without departing from the scope and spirit of the invention.

What is claimed is:

1. A method of focussing a microscope objective, comprising the steps of:
    imaging, through a microscope objective, a surface having at least one predetermined visual feature;
    determining, from the image of the at least one predetermined visual feature, a plurality of overlapping curves each of which represents a quality of focus for one of a plurality of different areas of the at least one predetermined visual feature; and
    positioning the microscope objective at an optimum focus position, relative to the surface, based upon the shape of the overlapping curves.

2. A method as set forth in claim 1 wherein the step of positioning includes the steps of:
    determining a current position of the microscope objective relative to an unknown optimum focus position, the position determination being based upon a local shape of at least one of the overlapping curves;
    positioning the microscope objective, in accordance with the determined current position of the microscope objective, to a first point that in nearer to the optimum focus position;
    sampling a predetermined one of the curves at the first point; and
    repositioning the microscope objective, in accordance with the sampled curve, to a second point that coincides with the optimum focus position.

3. A method as set forth in claim 1 wherein the step of imaging includes an initial step of forming the at least one predetermined visual feature by a step of projecting a shadow of an object upon the surface, the object being inclined at an angle to a plane of the surface.

4. A method of focussing a microscope objective, comprising the steps of:
    imaging, through a microscope objective, a surface having a visual feature;
    defining a plurality of areas-of-interest (AOI) that lie along a image of the visual feature;
    determining from the defined AOIs, as a function of a plurality of positions of the microscope objective, a set of overlapping curves that describe a focus figure-of-merit (FOM);
    determining a current position of the microscope objective relative to an unknown optimum focus position, the position determination being based upon a local shape of at least one of the FOM curves;
    positioning the microscope objective, in accordance with the determined current position, to a first point that is nearer to the optimum focus position;
    sampling the FOM curves at the first point; and
    repositioning the microscope objective, in accordance with the sample FOM curves, to a second point that coincides with the optimum focus position.

5. A method as set forth in claim 4 wherein the step of imaging includes an initial step of forming the visual feature by a step of projecting a shadow of an object upon the surface, the object being inclined at an angle to a plane of the surface.

6. A method as set forth in claim 4 wherein the step of imaging forms a two-dimensional image having rows and columns of image pixels, and wherein the step of determining a set of overlapping curves includes a step of compressing the two-dimensional image to a one-dimensional summed sequence of pixel amplitudes.

7. A method as set forth in claim 6 wherein, for each of the areas of interest, a corresponding FOM curve is determined based on a peak-to-peak amplitude of a gradient of the summed sequence, the gradient being determined as a discrete convolution of a derivative-of-gaussian filter and the summed sequence of pixel amplitudes.

8. A method as set forth in claim 4 wherein the step of determining a current position includes an initial step of classifying a plurality of possible microscope objective positions, or regions, based upon a local form of one or more of the FOM curves at each of the possible microscope objective positions.

9. A method as set forth in claim 8 wherein the step of classifying considers a sign of the slope of each of the FOM curves for each of the plurality of possible microscope objective positions.

10. A method as set forth in claim 8 wherein there are at least three AOIs, including a top AOI, a center AOI, and a bottom AOI, each of the AOIs having a centroid, and wherein the step of classifying classifies a plurality of regions (r) that include:
    r1, wherein the microscope objective position is too far positive relative to the center AOI centroid, and wherein the top FOM curve is monotonically decreasing;
    r2, where in the microscope objective position is slightly positive relative to the center AOI centroid, and wherein the top FOM curve is monotonically increasing and the center FOM curve is monotonically decreasing;
    r3, wherein the microscope objective position is in a near focus condition close to the center AOI centroid, and wherein the center FOM curve is near an amplitude maximum;
    r4, wherein the microscope objective position is slightly negative relative to the center AOI centroid, and wherein the bottom FOM curve is monotonically decreasing and the center FOM curve is monotonically increasing;
    r5, wherein the microscope objective position is significantly negative relative to the center AOI centroid, and wherein the bottom FOM curve is monotonically increasing; and
    r6, wherein the microscope objective position is indeterminate, and wherein all three FOM curves are non-monotonic.

11. A method as set forth in claim 4 wherein the step of determining a current position of the microscope objective and the step of positioning include the steps of:
  repositioning the microscope objective a plurality of times and sparsely sampling the FOM curves at each of a plurality of positions; and
  converging upon a region wherein the optimum focus position is known to be located.

12. A method as set forth in claim 5 wherein there are at least three AOIs, including a top AOI, a center AOI, and a bottom AOI, and wherein the step of determining a current position includes the steps of:
  A. with the microscope objective at a sample position n, determining and storing a FOM for each of the areas of interest, each FOM curve being determined based on a peak-to-peak amplitude of a gradient of a summed sequence (SS) of image pixel amplitudes for an associated one of the areas on interest, the gradient being determined as a discrete convolution of a derivative-of-gaussian (DOG) filter and the summed sequence of pixel amplitudes (DOG * SS);
  B. moving the microscope objective position to a position (n+1), and determining and storing a FOM for each of the areas of interest;
  C. moving the microscope objective to a position (n−1), and determining and storing a FOM for each of the areas of interest;
  D. examining the stored FOMs for regions (n−1, n, and n+1) so as to determine a monotonicity characteristic of each examined stored FOM;
  E. assigning, as a function of the determined monotonicity characteristics, a present position of the microscope objective to one of a plurality of predetermined possible microscope objective position regions;
  F. repositioning the microscope objective in a direction towards a region known to include the optimum focus position; and
  G. repeating steps A-F until the microscope objective is determined to be positioned within the region that is known to include the optimum focus position.

13. A method as set forth in claim 12 and further including the steps of:
  sampling the FOM of the center area of interest to obtain a first curve;
  determining a zero crossing point of the first curve and the FOM amplitude; and
  positioning the microscope objective at a position that corresponds to the zero crossing point, the zero crossing point position being the optimum focus position.

14. A method of focussing a microscope objective, comprising the steps of:
  providing, with the microscope objective, an image of a surface, the image including a feature;
  obtaining a plurality of areas-of-interest (AOIs) from the image of the feature;
  filtering the AOIs to obtain a focus figure-of-merit (FOM) curve for each;
  classifying a plurality of possible objective positions, or regions, based on a local form of the FOM curves at each of the positions;
  determining, from a shape of at least one of the FOM curves, a current region within which the microscope objective is positioned;
  based upon the determined current position, positioning the microscope objective at an intermediate position within a region known to include an optimum focus position;
  sampling one of the FOM curves at the intermediate position; and
  in accordance with the sampled one of the FOM curves, positioning the microscope objective at the final, optimum focus position.

15. Apparatus for focussing a microscope objective, comprising:
  means for imaging, through a microscope objective, a surface having at least one visual feature;
  means for determining, from the image, a plurality of overlapping curves each of which represents a quality of focus for different areas of the visual feature; and
  means for positioning the microscope objective at an optimum focus position, relative to the surface, based upon the shape of the overlapping curves.

16. Apparatus as set forth in claim 15 wherein said imaging means includes a two-dimensional detector array having a plurality of image pixels arranged in rows and columns.

17. Apparatus as set forth in claim 15 wherein said determining means includes data processing means coupled to memory means for storing therein data representing the determined overlapping curves.

18. Apparatus as set forth in claim 17 wherein said data processing means further includes an output coupled to said positioning means for controllably activating same to position the microscope objective.

19. Apparatus as set forth in claim 15 and further including means for projecting the visual feature upon the surface.

20. Apparatus as set forth in claim 15 wherein said microscope objective includes an optical path, said optical path including:
  means for receiving a collimated radiation beam;
  reduction optics disposed for illuminating the surface with the collimated radiation beam and for receiving reflected radiation from the surface;
  beamsplitter means disposed in said optical path for directing at least a portion of the reflected radiation to said imaging means; and
  a shadow projection wire disposed within said optical path and oriented at an angle with respect to a plane of the surface.

* * * * *